Figure 1:
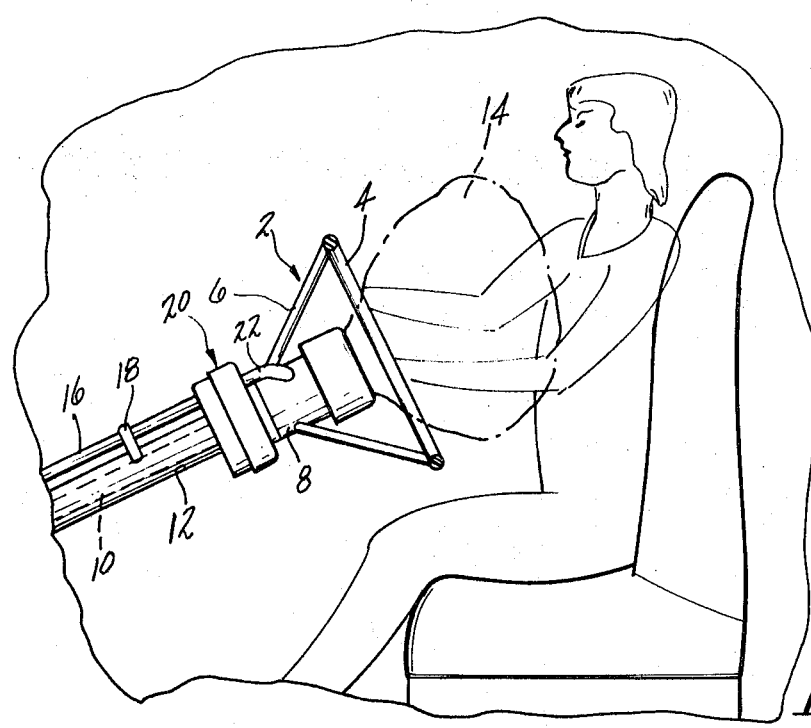

United States Patent [19]

Vancil

[11] 3,863,948
[45] Feb. 4, 1975

[54] ROTARY CONNECTION FOR A SAFETY BAG INFLATION SYSTEM

[75] Inventor: Rayburn D. Vancil, Carterville, Ill.

[73] Assignee: Olin Corporation, New Haven, Conn.

[22] Filed: Oct. 5, 1973

[21] Appl. No.: 403,735

[52] U.S. Cl. .......................... 280/150 AB, 280/87 R
[51] Int. Cl. .............................................. B60r 21/08
[58] Field of Search ..................... 280/150 AB, 87 R

[56] References Cited
UNITED STATES PATENTS

| | | | |
|---|---|---|---|
| 3,506,281 | 4/1970 | Berryman | 280/150 AB |
| 3,580,603 | 5/1971 | Chute | 280/150 AB |
| 3,680,884 | 8/1972 | Stephenson | 280/150 AB |
| 3,768,824 | 10/1973 | Kloppe et al. | 280/150 AB |
| 3,787,075 | 1/1974 | Francis | 280/150 AB |

FOREIGN PATENTS OR APPLICATIONS

| | | | |
|---|---|---|---|
| 609,624 | 9/1960 | Italy | 280/150 AB |

Primary Examiner—Kenneth H. Betts
Assistant Examiner—John P. Silverstrim
Attorney, Agent, or Firm—Donald R. Motsko; H. Samuel Kieser; W. W. Jones

[57] ABSTRACT

A system for feeding inflation gas to an air bag mounted on the steering wheel assembly of a vehicle. The steering wheel assembly includes adjacent rotating and fixed members, and the gas-feeding system includes an annular manifold mounted on the steering wheel assembly. The manifold includes a first part mounted on the rotating portion of the steering wheel assembly and a second part mounted on the fixed portion of the steering wheel assembly. A seal maintains a gas-tight joint between the first and second manifold parts.

1 Claim, 3 Drawing Figures

ROTARY CONNECTION FOR A SAFETY BAG INFLATION SYSTEM

This invention relates to an inflation system for use with safety bags in vehicles to protect vehicle passengers from injury in case of a collision. More particularly, the inflation system of this invention is designed for use with a steering wheel-mounted air bag which inflates to protect the driver from impacting the steering wheel upon collision.

The inflation system of this invention includes a first inflation gas conduit which is mounted on the steering column portion of the vehicle steering wheel assembly. The steering column is a housing which contains the rotatable steering shaft, but which housing itself is fixed and does not rotate. The steering shaft is connected to a rotatable steering wheel hub assembly which is disposed adjacent to the steering column, and to which the steering wheel rim is secured. A second inflation gas conduit is mounted on the steering wheel hub and extends into a cavity within the steering wheel hub, in which cavity is mounted the collapsed air bag. An annular manifold interconnects the first and second inflation gas conduits at the joint between the steering column and the steering wheel hub. The annular manifold is formed of two similar annular components, one of which is secured to the steering column and the other of which is secured to the steering wheel hub. A resilient seal is secured to one of the components and sealingly engages the other component to seal the joint therebetween against leakage of inflation gas. The annular shape of the manifold permits unbridled rotation of the hub-secured component with respect to the fixed steering column-secured component without causing a leak in the manifold.

It is, therefore, an object of this invention to provide an air bag inflation system for use in a vehicle safety environment wherein the inflatable air bag is mounted on the steering wheel of the vehicle.

It is an additional object of this invention to provide an inflation system of the character described wherein the air bag and a part of the inflation gas ducting conduits are mounted on a rotating portion of the vehicle steering assembly, and an additionl part of the inflation gas ducting conduits is mounted on a fixed portion of the vehicle steering assembly.

It is yet a further object of the invention to provide an inflation system of the character described wherein an annular manifold is utilized to interconnect the fixed conduit and the rotating conduit, the manifold comprising a fixed part and a rotating part.

Figure 2:
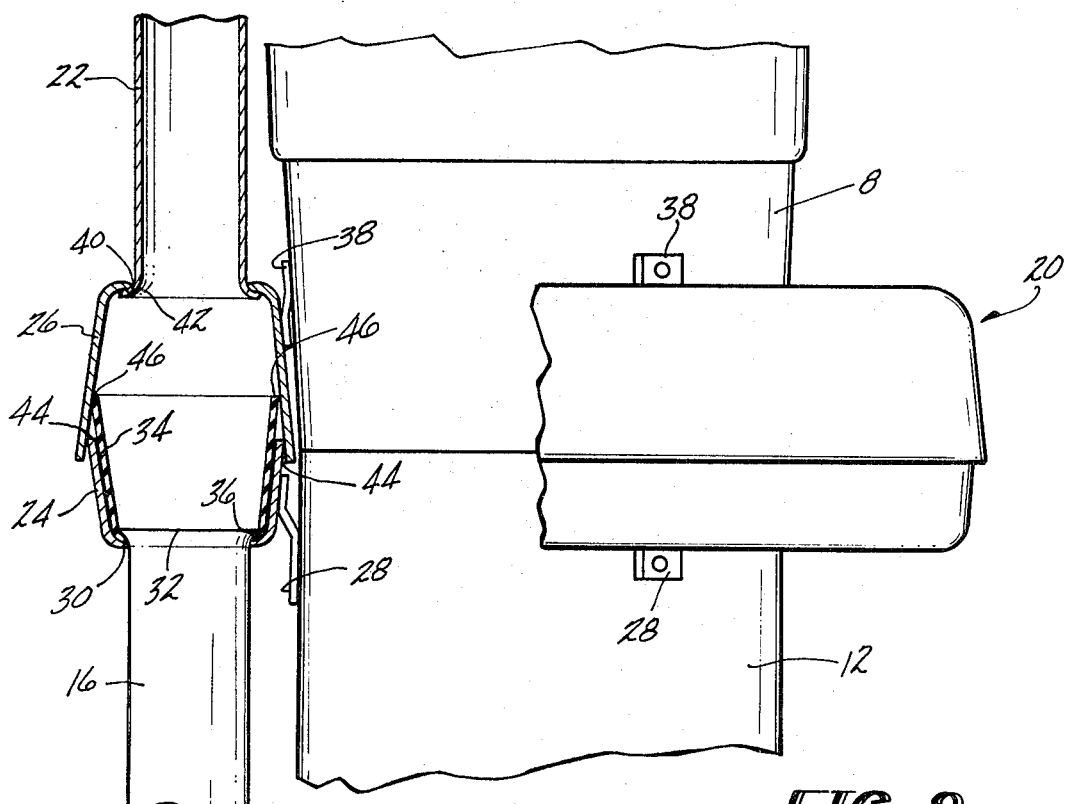
Figure 3:
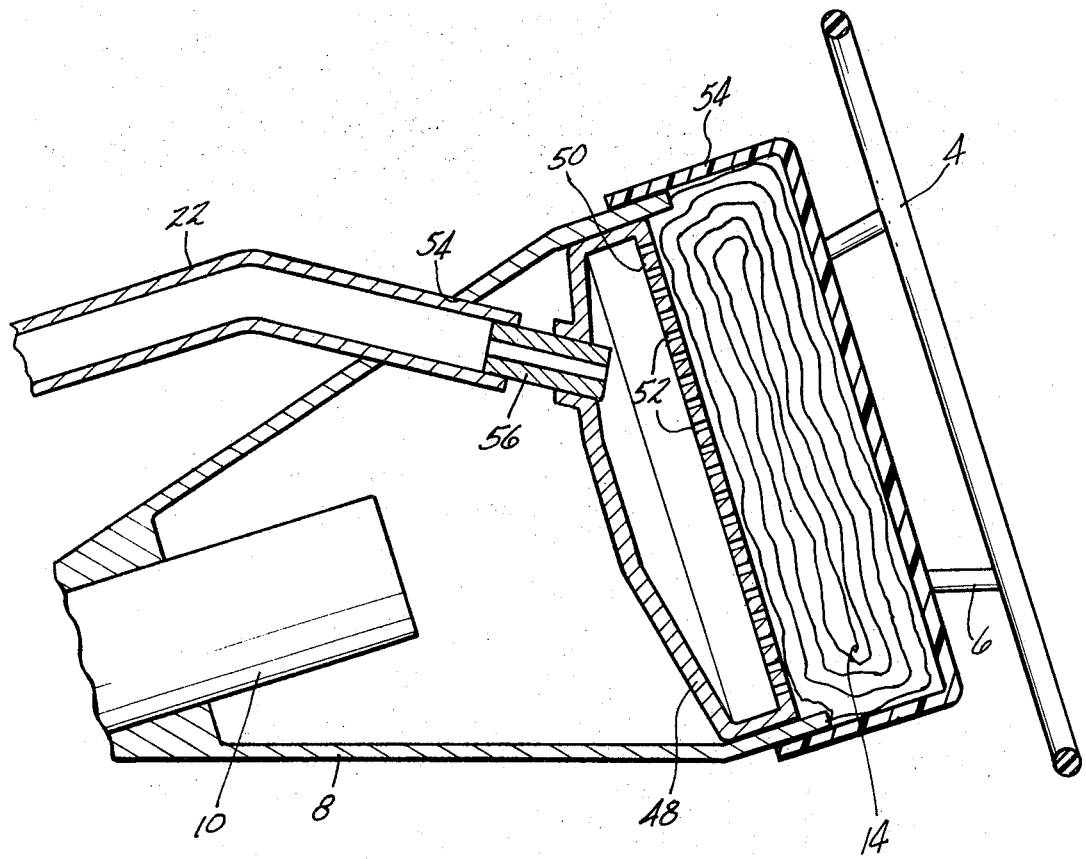

These and other objects and advantages of the inflation system of this invention will become more readily apparent from the following detailed description of a preferred embodiment taken in conjunction with the accompanying drawings, in which:

FIG. 1 is a schematic elevational view of the driver area of a vehicle showing the air bag of the system of this invention inflated in phantom to protect the driver from coming in contact with the steering wheel in the event of a collision;

FIG. 2 is an enlarged fragmented elevational view, partially in section, showing the portion of the vehicle steering assembly where the steering wheel hub meets the steering column, showing details of the annular manifold which interconnects the fixed inflation gas conduit with the movable inflation gas conduit; and FIG. 3 is a sectional view of the steering wheel hub portion showing the air bag in its collapsed, stored condition along with the ducting system for feeding inflation gas to the air bag.

Referring now to the drawings, FIG. 1 shows the steering wheel assembly 2 of an automobile. The assembly includes a steering wheel rim 4 which is secured by spokes 6 to a hub 8. The hub 8 is secured to a steering shaft 10 (see FIG. 3) disposed in a fixed steering column housing 12. The air bag 14 (shown inflated in phantom) is mounted in its collapsed condition inside of the steering wheel hub 8, which is hollow.

FIGS. 1 and 2 show the inflation gas ducting system used to inflate the air bag 14. A first gas conduit 16 is mounted on the fixed steering column 12 by means of brackets 18. The first conduit 16 leads from a conventional source of inflation gas (not shown) to a compound annular gas manifold 20, the specific construction of which is shown in FIG. 2. A second gas conduit 22 extends from the manifold 20 into the steering wheel hub 8. It will be noted that the rim 4, spokes 6, hub 8 and shaft 10 of the steering assembly of the vehicle all rotate, while the steering column 12 does not rotate. Thus the first gas conduit 16 does not rotate, but the second gas conduit 22 does move in an arcuate path about the axis of the hub 8.

In order to interconnect the fixed conduit 16 with the moving conduit 22, the manifold 20 is formed from two annular trough-like parts 24 and 26. The first trough 24 is secured to the steering column 12 by clips 28 and includes an opening 30 through which passes the fixed conduit 16. The end of the fixed conduit 16 may be flared as at 32 for securement to the trough 24. A flexible annular trough-like sealing member 34 is nested inside of the fixed trough 24 and includes an opening 36 through which the flared end 32 of the conduit 16 extends. Thus the sealing member 34 is held in place within the fixed trough by having the edges of the opening 36 trapped between the fixed trough 24 and the flared end 32 of the fixed conduit 16. The second trough 26 is secured to the hub 8 by clips 38 so that the trough 26 rotates with the hub 8. The second trough 26 includes an opening 40 through which the second conduit 22 extends, the end of the second conduit 22 being flared as at 42 for securement of the second conduit 22 to the second trough 26. It will be noted that the free end of the second trough 26 overlies the free end of first trough as at 44, and the sealing member 34 has a terminal lip 46 which, owing to the resiliency of the sealing member 34, is biased into snug engagement with the inside surface of the second trough 26. It will be readily appreciated that, owing to the annular shape of the troughs 24 and 26 and the sealing member 34, rotation of the hub 8 and trough 26 will not disrupt the seal formed at 46 by the sealing member 34.

Referring now to FIG. 3, there is shown the means for mounting the air bag 14 in the steering wheel hub 8, and the means for ducting inflation gas from the second conduit 22 into the air bag. As will be noted from FIG. 3, the steering wheel hub 8 is a hollow member which is secured to the steering shaft 10. A hollow gas diffuser member 48 is mounted in the hub 8, the diffuser 48 including a plate 50 having a plurality of perforations 52 through which inflation gas can pass from the interior of the diffuser into the air bag 14. The air bag 14 is mounted on the diffuser and is folded into a compact configuration and held in place by a cap 54 of resilient foam plastic material, the cap 54 being press fitted onto the hub 8 but readily dislodged therefrom when the air bag is inflated. The second conduit 22 extends through an opening 54 in the hub 8 into the interior thereof and is connected to a nozzle member 56 opening into the interior of the diffuser 48.

The inflation system of this invention operates as follows. When the equipped vehicle is involved in a collision, a conventional collision sensor (not shown) senses this occurrence and actuates the inflation gas source (not shown). Inflation gas is then caused to flow into the first conduit 16 and thence into the annular manifold 20. As previously noted, the joint between the fixed and rotating troughs 24 and 26 respectively remains sealed by the sealing member 34 irrespective of the rotational position of the rotating trough 26, thus gas flows from the annular manifold 20 into the second conduit 22. Gas flows from the second conduit 22 through the nozzle 56 into the interior of the diffuser and thence through the perforations 52 into the air bag 14, inflating the latter toward the driver. When the air bag 14 inflates, it dislodges the cap 54 from the hub 8 and expands toward the driver.

It will be readily appreciated that the ducting system of this invention permits an air bag mounted on the rotating steering wheel of a vehicle to be used in conjunction with a fixed source of inflation gas which may be positioned remote from the steering wheel in a convenient location such as under the vehicle dash board, or in the engine compartment of the vehicle. The annular shape of the inflation gas manifold and its compound construction ensure that the manifold will remain sealed regardless of the rotational attitude of the steering wheel hub and air bag.

Since many changes and variations of the disclosed embodiment of the invention may be made without departing from the inventive concept, it is not intended to limit the invention otherwise than as required by the appended claims.

What is claimed is:

1. A vehicle safety assembly mounted on a steering asembly of the vehicle, said steering assembly including a steering column fixed to the vehicle; a steering shaft rotatably mounted within said steering column; a steering wheel having a longitudinally elongated hub which is fixed to said steering shaft, said hub having a hollow interior; said safety assembly comprising an air bag stored in a collapsed condition within said hub; first conduit means mounted externally of said steering column and fixed thereto for ducting air bag inflation gas; second conduit means mounted externally of said hub, said second conduit means communicating with the interior of said hub through an opening in said hub upstream of said air bag, said second conduit means being fixed to the exterior of said hub and rotatable therewith, and said second conduit means being operable to duct air bag inflation gas into the interior of said hub; and an annular manifold interposed between said first and second conduit means for establishing fluid-ducting connection therebetween, said manifold including a first annular portion fixed to and completely encircling the exterior of said steering column, and a second annular portion fixed to and completely encircling the exterior of said hub and rotatable therewith, said first conduit means opening into said first manifold portion and said second conduit means opening into said second manifold portion; and annular seal means fixed to one of said manifold portions and disposed in sliding sealing engagement with the other of said manifold portions to form a gas-tight seal between said first and second manifold portions.

* * * * *